United States Patent
Lopez et al.

(10) Patent No.: US 10,056,632 B2
(45) Date of Patent: Aug. 21, 2018

(54) METHOD FOR CONTROLLING AN ELECTROLYSIS SYSTEM TAKING INTO ACCOUNT THE TEMPERATURE OF THE ELECTROLYSER MODULES OF THE SAID ELECTROLYSIS SYSTEM

(71) Applicant: COMMISSARIAT A L'ENERGIE ATOMIQUE ET AUX ENERGIES ALTERNATIVES, Paris (FR)

(72) Inventors: Mathias Lopez, Gaillac (FR); Cyril Bourasseau, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 306 days.

(21) Appl. No.: 14/880,771

(22) Filed: Oct. 12, 2015

(65) Prior Publication Data
US 2016/0104908 A1    Apr. 14, 2016

(30) Foreign Application Priority Data

Oct. 13, 2014    (FR) ..................................... 14 59781

(51) Int. Cl.
*H01M 8/06* (2016.01)
*H01M 8/0656* (2016.01)
(Continued)

(52) U.S. Cl.
CPC ............ *H01M 8/0656* (2013.01); *C25B 1/04* (2013.01); *C25B 9/18* (2013.01); *C25B 15/02* (2013.01);
(Continued)

(58) Field of Classification Search
CPC ........... H01M 10/502; H01M 10/5093; H01M 10/501; H01M 10/486; H01M 16/003;
(Continued)

(56) References Cited

U.S. PATENT DOCUMENTS

2010/0114395 A1    5/2010 Hinatsu et al.
2012/0175952 A1    7/2012 Hinatsu et al.
(Continued)

FOREIGN PATENT DOCUMENTS

| FR | 2 960 559 A1 | 12/2011 |
| FR | 2 960 560 A1 | 12/2011 |
| WO | 2010/048706 A1 | 5/2010 |

OTHER PUBLICATIONS

French Search Report and Written Opinion dated Jun. 9, 2015, issued in counterpart French application No. 1459781; with partial English translation and partial English machine translation (17 pages).

*Primary Examiner* — Raymond Alejandro
(74) *Attorney, Agent, or Firm* — Westerman, Hattori, Daniels & Adrian, LLP

(57) ABSTRACT

The method for controlling an electrolysis system (1) having a plurality of electrolyser modules (2) and designed to cooperate with a system (3) for supplying electric energy which uses an intermittent energy source includes: determining (E1) an available electric power which the electric energy supply system (3) can provide; evaluating (E2) a suitable number $N_e$ of electrolyser modules (2) to be used according to the available electric power; selecting (E3) electrolyser modules (2) to be supplied electrically, taking into account the number evaluated $N_e$; determining (E4) the temperature of each electrolyser module selected; and electrically supplying (E5) the selected electrolyser modules (2) by the electric energy supply system according to a distribution of the available electric power depending on the temperatures determined (E4) of each of the electrolyser modules selected.

21 Claims, 3 Drawing Sheets

(51) Int. Cl.
  *C25B 1/04* (2006.01)
  *C25B 15/02* (2006.01)
  *C25B 9/18* (2006.01)
  *H02J 3/28* (2006.01)
  *H02J 3/38* (2006.01)
  *H02J 15/00* (2006.01)

(52) U.S. Cl.
  CPC ............... *H02J 3/28* (2013.01); *H02J 3/386* (2013.01); *H02J 15/00* (2013.01); *H01M 2250/10* (2013.01); *Y02B 90/14* (2013.01); *Y02E 60/366* (2013.01)

(58) Field of Classification Search
  CPC ......... H01M 2250/40; H01M 2250/10; H01M 8/0656; C25B 1/04; C25B 9/18; H01J 3/28; H01J 3/386; Y02E 60/366
  See application file for complete search history.

(56) References Cited

U.S. PATENT DOCUMENTS

| | | | |
|---|---|---|---|
| 2012/0175954 A1* | 7/2012 | Hinatsu | C25B 15/02 307/31 |
| 2013/0093194 A1 | 4/2013 | Barbachano et al. | |
| 2013/0168236 A1 | 7/2013 | Zadeh et al. | |

* cited by examiner

METHOD FOR CONTROLLING AN ELECTROLYSIS SYSTEM TAKING INTO ACCOUNT THE TEMPERATURE OF THE ELECTROLYSER MODULES OF THE SAID ELECTROLYSIS SYSTEM

TECHNICAL FIELD OF THE INVENTION

The invention relates to the field of energy control.
The object of the invention is more particularly a method for controlling an electrolysis system.

PRIOR ART

The development of energy requirements and the trend for sustainable development has provided the impetus for many techniques for use of renewable energy sources.

A renewable energy source can be solar energy, or wind-powered or hydraulic energy.

Many devices exist which can interact with a renewable energy source, such as to transform at least part of the associated energy into electric energy. This is the case for example with photovoltaic panels which interact with solar energy, wind-powered devices which interact with the wind, or hydraulic devices which interact with water.

This electric energy, obtained from the devices cited above by way of example, can be injected into an electricity network.

The functioning of an electricity network needs the production to equal the consumption at all times. The consumption is to a large extent estimated in advance, and the production is controlled according to this estimated consumption.

This therefore results in a problem associated with the fact that, by definition, the production of electricity from a renewable energy source is unpredictable because of its intermittence.

For this reason there is a need to resolve the problem of interaction of a renewable energy source with an electricity network when it is wished to inject energy obtained from the said renewable energy source into the said electricity network.

This need has been fulfilled in particular by solutions of the type described in document WO2010/048706. This document describes a method wherein the electric energy obtained from photovoltaic panels is stored in the form of hydrogen thanks to an electrolyser which is connected to the said panels. Thus, the hydrogen stored can then be taken out of storage to operate a fuel battery which is connected to the electricity network, according to the consumption needs of the said electricity network. This document proposes a strategy which makes it possible to adapt the functioning of electrolyser modules according to their temperatures. It is known that the efficiency of an electrolyser module is all the better the higher its temperature, and for this purpose the strategy adopted is to select the optimum functioning point of the electrolyser modules according to their temperatures in order to distribute the electric current obtained from the photovoltaic panels.

This strategy does not propose sufficient optimisation of the generation of hydrogen.

Subject of the Invention

The objective of the present invention is to propose a solution which improves the functioning of an electrolysis system, in particular whilst making it possible to increase the efficiency of production output from the electrolysis system.

A move towards this objective is made by means of a method for controlling an electrolysis system which comprises a plurality of electrolyser modules and is designed to cooperate with an electric energy supply system which uses an intermittent energy source, the said method comprising:
  a step of determination of an available electric power which the said electric energy supply system can provide;
  a step of evaluation of a suitable number $N_e$ of electrolyser modules to be used according to the available electric power determined;
  a step of selection of electrolyser modules to be supplied electrically, taking into account the said number evaluated $N_e$;
  a step of determination of the temperature of each of the electrolyser modules selected;
  a step of electric supply of the electrolyser modules selected by the said electric energy supply system according to a distribution of the available electric power determined depending on the temperatures determined of each of the electrolyser modules selected.

Advantageously, with each electrolyser module being configured such as to adopt an active state when it is supplied by the said electric energy supply system, or an inactive state when it is not supplied by the said electric energy supply system, the said step of selection of the electrolyser modules comprises a step of determination of a current number of active electrolyser modules.

According to one embodiment, when the said current number of active electrolyser modules determined is equal to the said number evaluated $N_e$, then the selection step consists of selecting all the active electrolyser modules.

According to one embodiment, the step of selection of the electrolyser modules comprises a step of determination of temperatures of at least some of the electrolyser modules.

According to one form of the said embodiment, with the determined current number of active electrolyser modules being greater than the number evaluated $N_e$, the said temperatures determined during the said selection step are those of the active electrolyser modules, and the electrolyser modules selected by the said selection step correspond to the $N_e$ active electrolyser modules with the highest temperatures, and the step of electric supply of the said electrolyser modules selected consists of supplying electrically only the said electrolyser modules selected.

According to another form of the said embodiment, with the current number of active electrolyser modules determined being lower than the number evaluated $N_e$, the said temperatures determined during the said selection step are those of the inactive electrolyser modules, and the electrolyser modules selected by the said selection step correspond to the active electrolyser modules plus at least one inactive electrolyser module, the temperature of which determined during the said selection step is the highest, and the step of electric supply of the said electrolyser modules selected consists of supplying electrically only the said electrolyser modules selected.

Preferably, the step of evaluation of the said suitable number $N_e$ of electrolyser modules to be used is calculated from the following equation:

$$NB_{WHOLE}\left(\frac{P_{available}}{P_{max\_module}}\right) + 1$$

where $P_{available}$ is the available electric power determined, $P_{max\_module}$ is the maximum power which each electrolyser module can receive, and $NB_{WHOLE}$ is the function which provides a whole value of the ratio $$\frac{Pavailable}{Pmax\_module}.$$

The method can comprise a step of determination of the said distribution of the available power determined, comprising, for each electrolyser module selected:
  a step of determination of a theoretical optimised coefficient of distribution of the available power determined, taking into account the temperature measured of the said electrolyser module selected;
  a step of determination of a real coefficient of distribution to be used for the said electrolyser module selected, taking into account the said corresponding theoretical optimised coefficient;
the said step of determination of the said distribution additionally comprising a step of adjustment of the said real coefficients, in particular in which the difference between each theoretical optimised coefficient and the corresponding real coefficient is minimised.

In particular, the minimisation of the difference between each optimised theoretical coefficient and the corresponding real coefficient can take into account the following constraints:
  the sum of the real coefficients of the said electrolyser modules selected is equal to 1;
  for each electrolyser module selected, the corresponding real coefficient is less than, or equal to, the maximum power of the said electrolyser module selected divided by the available power determined;
  for each electrolyser module selected, the corresponding real coefficient is higher than, or equal to, a minimum power of the said electrolyser module selected divided by the number evaluated $N_e$.

The invention relates to an energy storage installation in the form of a product containing hydrogen, comprising:
  an electric energy supply system configured such as to exploit an intermittent energy source;
  an electrolysis system comprising a plurality of electrolyser modules, and configured such as to cooperate with the said electric energy supply system;
  a module to control the installation, comprising the hardware and software elements for implementation of the control method as described.

BRIEF DESCRIPTION OF THE DRAWINGS

Other advantages and characteristics will become more apparent from the following description of particular embodiments of the invention, provided by way of non-limiting example and represented in the appended drawings, in which.

DESCRIPTION OF PREFERRED EMBODIMENTS OF THE INVENTION

The method described hereinafter differs from the prior art in particular in that selection will be made of a certain number of electrolyser modules to be supplied electrically, this number of electrolyser modules to be supplied being determined on the basis of the electric power available. This makes it possible to make a limited number of electrolyser modules function, whilst benefiting the efficiency of the electrolyser modules supplied.

According to a particular embodiment, the temperatures of certain electrolyser modules will be determined, in particular by measurement, in order to participate in the selection of the said electrolyser modules to be used according to the electric power available.

Figure 1:
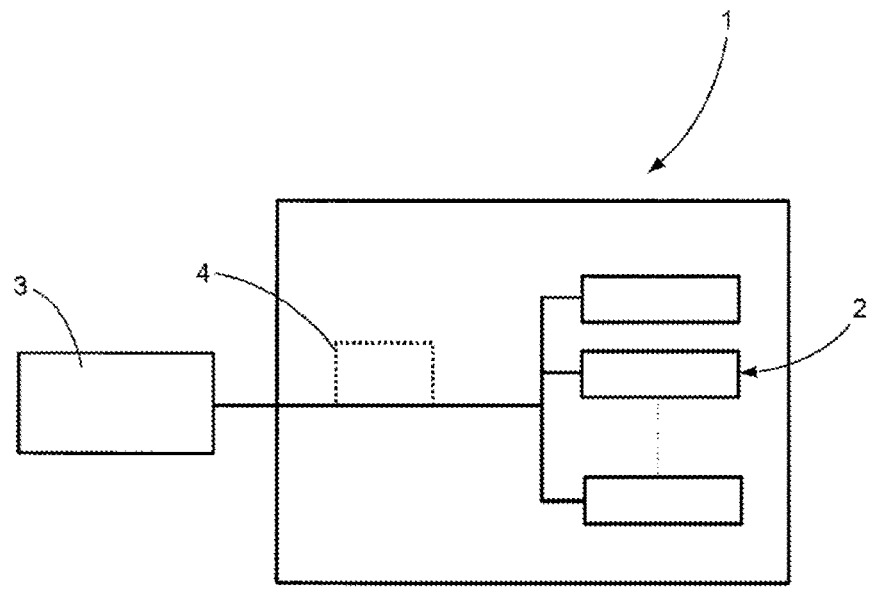
FIG. 1 is a schematic view of the components used within the context of implementation of the method according to an embodiment of the invention.

As illustrated in FIG. 1, an electrolysis system 1 comprises a plurality of electrolyser modules 2, and is designed to cooperate with an electric energy supply system 3 which exploits an intermittent energy source.

In the present description, an intermittent energy source can be subjected, and in this case the intermittent energy source can be a renewable energy source such as wind-powered, photovoltaic, hydraulic energy, etc. Alternatively, the energy source can be intermittent because of an intermittent electric supply required for technical or economic reasons.

In other words, the electric energy supply system 3 can either exploit the energy obtained from the intermittent energy source directly, if the latter is an intermittent electric energy source, or it can exploit the intermittent energy source such as to generate electricity, in order to supply the electrolysis system 1 electrically.

Preferably, when it is supplied by the electric energy supply system 3, each electrolyser module 2 makes it possible to produce a hydrogen-based product which can be stored, derived in particular from water. Electrolysis of water is preferable since it makes it possible to limit direct emission of greenhouse gas.

Within the context of the present invention, use can be made of two main technologies for electrolysis of water at low temperature, based on alkaline electrolyser modules or PEM electrolyser modules (the acronym signifies that the electrolyser concerned comprises a proton exchange membrane). Each of these technologies has advantages/disadvantages compared with one another in terms of investment cost, maximum production capacity, quality of the hydrogen produced, and flexibility of functioning.

The electrolyser modules 2 of the electrolysis system 1 are also known in the field by the name of "multi-stack electrolysers" or "stack of cells". The electrolysis system 1 is one which is composed of a plurality of stacks of electrolysis cells (i.e. a plurality of electrolyser modules) which can function independently from one another. This makes it possible to add flexibility to the electrolysis system, which then has a more extensive functioning range.

The increase in the number of electrolyser modules makes it possible inter alia to increase the maximum production capacity of the PEM electrolyser modules, which is generally limited in certain present applications to a few tens of normal cubic metres of hydrogen per hour and per electrolysis module.

In addition, the increase in the number of electrolyser modules within a single electrolysis system makes it possible to facilitate the adaptation of the fluctuations of the intermittent energy profiles, by distributing the energy available over a plurality of electrolyser modules.

The use of a plurality of electrolyser modules 2 also makes it possible to carry out maintenance operations on an electrolyser module 2, in particular by disconnecting it from the electrolysis system 1, whilst maintaining the production of the electrolysis system 1 as a whole.

In particular, the invention relates to a method for controlling an electrolysis system 1, the electrolyser modules 2 of which are designed to cooperate with the electric energy supply system 3 which exploits the intermittent energy source.

Figure 2:
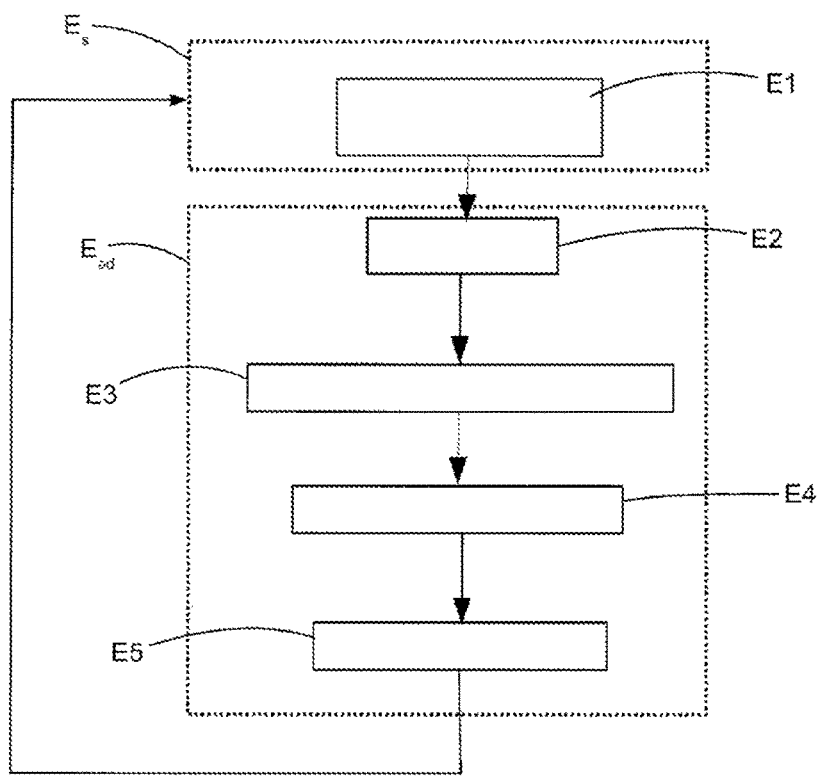
FIG. 2 represents different steps of the control method according to a particular embodiment of the invention.

As illustrated in FIG. 2, this method advantageously comprises a step E1 of determination of an available electric power Pavailable which the said electric energy supply system 3 can provide. This step E1 makes it possible for example at a given moment to determine the electric power available at the output of the electric energy supply system 3, in order to optimise the production of the electrolysis system 1 by taking this available electric power into account.

In this respect, the method can comprise a step $E_s$ of monitoring the development of the electric power available, making it possible to trigger a step of adaptation of the functioning of the electrolysis system 1. This monitoring step $E_s$ then comprises the step E1 of determination of the electric power available, which for example is implemented at regular intervals. The adaptation step can be triggered for example when, between two successive iterations of the monitoring step $E_s$, the value of the available electric power determined is different, or differs by a predetermined difference threshold.

The method additionally comprises a step E2 of evaluation of a suitable number $N_e$ of electrolyser modules 2 to be used according to the available electric power determined $P_{available}$, as well as a step E3 of selection of electrolyser modules 2 to be supplied electrically, taking into account the said number $N_e$ evaluated. It will be understood in this case that when the electrolyser modules 2 have been selected they will then be the only ones supplied electrically by the electric energy supply system 3, such as to participate in the generation of a product which can be stored, such as a hydrogen-based product.

The suitable number $N_e$ of electrolyser modules 2 preferably corresponds to the minimum number of electrolyser modules 2 to be made to function in order to use all of the available power $P_{available}$.

According to one embodiment, the electrolyser modules 2 of the plurality of electrolyser modules 2 are all functional, i.e. they are able to go into an active state.

In addition, the number $N_e$ is preferably strictly lower than the total number of electrolyser modules 2 of the plurality of electrolyser modules 2, and in particular irrespective of the available power determined: in this case, the total number of electrolyser modules can be determined on the basis of particular dimensioning of the electric energy supply system 3, which for example is limited to maximum power which depends on the said total number.

In particular, the step E2 of evaluation of the said suitable number $N_e$ of electrolyser modules 2 to be used is calculated on the basis of the following equation:

$$Ne = NB_{WHOLE}\left(\frac{Pavailable}{Pmax\_module}\right) + 1$$

wherein $P_{available}$ is the available electric power determined, $P_{max\_module}$ is the maximum power which each electrolyser module 2 can receive (known characteristic of the electrolyser module), and $NB_{WHOLE}$ is the function which provides a whole value of the ratio $$\frac{Pavailable}{Pmax\_module}.$$

In particular, the whole value corresponds to a lower whole rounded number.

The method can then comprise a step E4 of determination of the temperature of each of the electrolyser modules 2 selected, followed by a step E5 of electric supply of the electrolyser modules 2 selected by the said electric energy supply system 3, according to a distribution of the available electric power determined depending on the temperatures determined of each of the electrolyser modules 2 selected.

For this purpose, the functioning of the electrolyser modules 2 selected will be determined according to their temperatures. A strategy of this type based on the use of the temperatures of the electrolyser modules 2 selected is advantageous in the sense that the production of an electrolyser module has a different efficiency according to its current functioning temperature. In particular, each electrolyser module 2 has a functioning temperature which develops over a period of time according to the heat generated by the electrolysis reaction (which itself depends on the functioning point, i.e. on the electric intensity which circulates through the said electrolyser module 2), and according to thermal losses in relation to the environment and optionally a cooling system which is activated if a maximum functioning temperature is reached, in order to avoid an increase in temperature of the said electrolyser module 2 which can be a source of deterioration of the said electrolyser module. Alternatively, the cooling system can be put into use at regular intervals, or it can be a cold power which adapts to the functioning point. By way of example, the increase in the functioning temperature of an electrolyser module 2 has the effect of improving its hydrogen production efficiency. A PEM electrolyser module which functions at 60° C. will be approximately 10% more efficient than the same electrolyser module 2 functioning at 20° C.

The maximum functioning temperature can be present for reasons of safety and wear. Beyond this maximum functioning temperature, the cooling system of the electrolyser module 2 concerned will be activated in order to ensure that its temperature is maintained below a fixed limit. Putting the cooling system(s) into use involves energy consumption which is unfavourable to the electrolysis system 1, since this energy does not contribute towards the production of hydrogen. The advantages can therefore be understood of distributing the energy available suitably to the electrolyser modules selected according to their temperatures, in order to optimise the production of these modules. Thus, when each electrolyser module is associated with a cooling system, the distribution of the available power determined by the supply step can be implemented such as to prevent or limit, for each electrolyser module 2 selected, the putting into use of the associated cooling system. The manner of distributing the available power determined will be described in greater detail hereinafter.

Thus, each electrolyser module 2 of the electrolysis system 1 can function independently from the other electrolysers, and in particular with different functioning set points, which in particular depend on the temperature of the said electrolyser module 2.

Reference has previously been made to the step $E_s$ of monitoring the development of the available power which makes it possible to trigger the step of adaptation of the functioning of the electrolysis system 1. In this particular example, the adaptation step $E_{ad}$ comprises the steps E2, E3, E4 and E5. In particular, when this adaptation step $E_{ad}$ has ended (i.e. after implementation of the step E5 in the example) then the method loops back to the step $E_s$ of monitoring the development of the available power, as illustrated in FIG. 2.

In general, each electrolyser module 2 is configured such as to adopt an active state when it is supplied with electric energy by the said supply system 3, or an inactive state when it is not supplied with electric energy 3 by the said supply system 3. Preferably, the supply step E5 is such that, when it is implemented, only the electrolyser modules selected are in the active state, and the others are in the inactive state.

Preferably, the step E3 of selection of the electrolyser modules comprises a step E6 of determination (FIG. 3) of a current number of active electrolyser modules 2. This current number is preferably that at the moment when the step E2 of selection of electrolyser modules is implemented.

Figure 3:
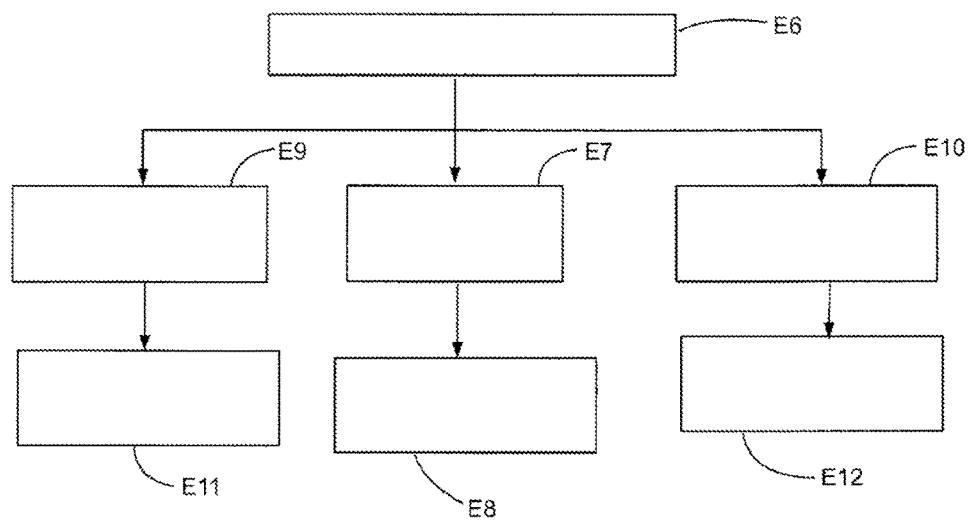
FIG. 3 illustrates in greater detail the step of selection of the electrolyser modules in FIG. 2.

In particular, as illustrated in FIG. 3, the step E6 of determination of the current number of active electrolyser modules 2 makes it possible to participate in the strategy for the selection of the said electrolyser modules 2 to be supplied electrically, whilst taking into account the said number evaluated $N_e$.

In a first case, if the said current number determined of active electrolyser modules 2 is equal to the said number evaluated $N_e$ (step E7), then the selection step E3 consists of selecting all the electrolyser modules which are active at the moment of implementation of the said selection step. In other words, the electrolyser modules selected are all those in the active state (step E8). In this case, the step E5 of electric supply of the electrolyser modules consists of maintaining the electric supply of the said active electrolyser modules 2, with or without modification of the distribution of the available power determined.

According to one embodiment the step E3 of selection of the electrolyser modules comprises a step of determination of temperatures of at least some of the electrolyser modules 2. The temperatures determined of the said at least some of the electrolyser modules 2 will then participate in the selection of the said electrolyser modules 2. This implementation is preferably used in different cases from the first case described above.

In particular, in a second case, the current number determined of active electrolyser modules 2 is higher than the number evaluated $N_e$ (step E9) and, in a third case, the current number determined of active electrolyser modules 2 is lower than the number evaluated $N_e$ (step E10).

In the second case (step E9), the step E3 of selection of the electrolyser modules 2 will preferably consist of selecting from amongst the electrolyser modules 2 which are already active only the $N_e$ electrolyser modules 2 which are already active, the temperatures of which are the highest. In other words, it will be attempted to deactivate the active electrolyser module(s) 2 which is/are the coldest, and the efficiency of which is considered to be the lowest. In other words, when the current number determined of active electrolyser modules 2 is higher than the number evaluated $N_e$, the said temperatures determined during the said selection step E3 are those of the active electrolyser modules 2, and the electrolyser modules 2 selected by the said selection step E3 correspond to the $N_e$ active electrolyser modules 2, the temperatures of which are the highest. In this case, the step E5 of electric supply of the said electrolyser modules 2 selected consists of supplying electrically only the said electrolyser modules 2 selected (which are then considered in the active state), and the electrolyser modules 2 which are not supplied are then in the inactive state.

In the third case (step E10), the step E3 of selection of the electrolyser modules 2 to be supplied will preferably consist of selecting all the modules which are already active, and of adding to this selection at least one electrolyser module 2 in the inactive state, the temperature of which is the highest out of the inactive electrolyser modules 2. In other words, when the current number determined of active electrolyser modules 2 is lower than the number evaluated $N_e$, the said temperatures determined during the said selection step E3 are those of the inactive electrolyser modules 2, and the electrolyser modules 2 selected by the said selection step E3 is correspond to the active electrolyser modules 2, plus at least one inactive electrolyser module 2, the temperature of which determined during the said selection step E3 is the highest. In this third case, the step E5 of electric supply of the said electrolyser modules 2 selected consists of supplying electrically only the said electrolyser modules 2 selected (which are then considered in the active state), and the electrolyser modules 2 which are not supplied are then in the inactive state.

Advantageously, there is selection, from amongst the inactive electrolyser modules, of the $N_e$ hottest electrolyser modules, less the current number determined. If it is necessary to select an inactive electrolyser module 2, in particular when at least two inactive electrolyser modules 2 are liable to be selected because their temperatures are identical or similar, selection will be made of the electrolyser module 2, the total functioning time of which is the shortest. For example, each electrolyser module 2 can be associated with a counter which counts its functioning time since it was put into service. As an alternative to the functioning time, the selection can be carried out randomly.

In a fourth case, the electrolysis system 1 can be at a standstill, and therefore all the electrolyser modules are placed in the inactive state. In this case, the selection step E3 comprises the determination of the temperature of each of the electrolyser modules 2, and only the hottest $N_e$ electrolyser modules are selected.

In order to optimise the resources, in the second, third and fourth cases, the step E4 of determination of the temperature of each of the electrolyser modules selected can use all or part of the data obtained from the step of determination of temperatures of the said at least some of the electrolyser modules 2 implemented by the selection step E3.

Figure 4:
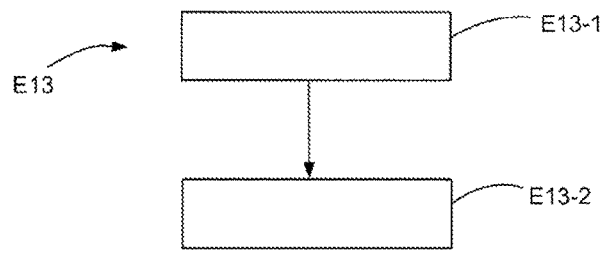
FIG. 4 illustrates a particular embodiment of the electric supply step in FIG. 2.

The advantages have previously been described of a good distribution of the available power determined by the step E5 of supply, amongst the electrolyser modules 2 selected. For this purpose, the control method, and in particular the step E5, comprises a step E13 of determination of the said distribution of the available power determined which can comprise (FIG. 4), for each electrolyser module 2 selected:

- a step E13-1 of determination of a theoretical optimised coefficient of the distribution of the available power determined, taking into account the temperature measured of the said electrolyser module 2 selected;
- a step E13-2 of determination of a real coefficient of distribution to be used for the said electrolyser module 2 selected, taking into account the said corresponding theoretical optimised coefficient, the said step of determination of the said distribution additionally comprising a step of adjustment of the said real coefficients, in which in particular the difference between each theoretical optimised coefficient and the corresponding real coefficient is minimised.

According to a particular example, for each electrolyser module selected with an index i (with i ranging from 1 to $N_e$) the corresponding theoretical optimised coefficient $\alpha_i^{optimised}$ can be obtained according to the following formula:

$$\alpha_i^{optimised} = \exp\left(-\left(\frac{Tmax - Ti}{Tmax - Topti}\right)\right) * \left(\frac{Tmax - Ti}{Tmax - Topti}\right) \quad (1)$$

With Tmax as the maximum temperature which the electrolyser module 2 can reach before triggering of a system for cooling of the said electrolyser module, Topti is the optimum functioning temperature of an electrolyser module 2, and Ti is the temperature determined of the said corresponding electrolyser module 2.

Tmax can have an identical value for each of the electrolyser modules.

Topti is generally representative of a temperature lower than an accepted maximum functioning temperature of the said electrolyser module, and lower than the starting temperature of the cooling system. It is also considered that Topti is higher than minimum functioning temperature of the electrolyser module, and preferably higher than 50° C.

Figure 5:
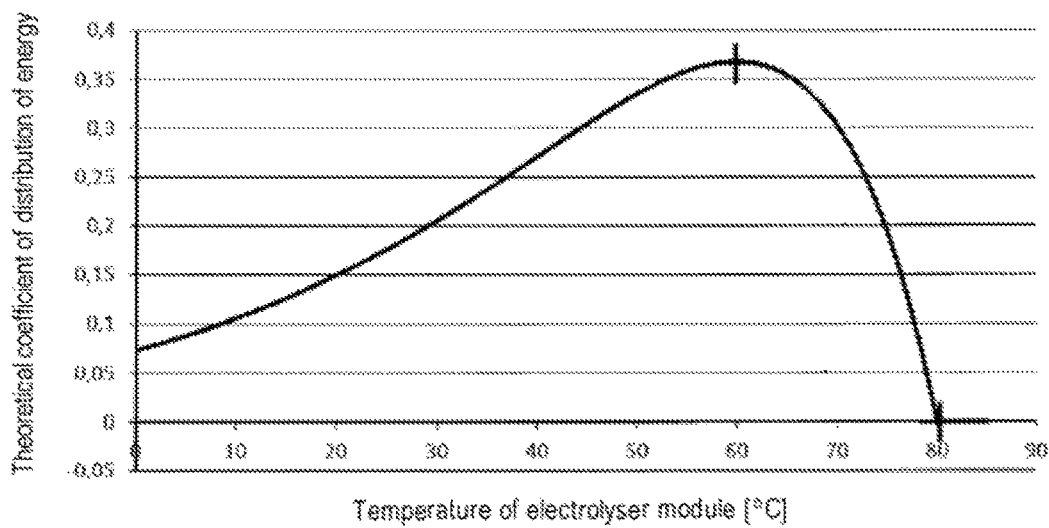
FIG. 5 illustrates an example of the development of the theoretical optimised coefficient of distribution of the energy according to the temperature of the electrolyser module.

Typically, FIG. 5 illustrates by way of example the variation of the theoretical coefficient of distribution according to the temperature of the electrolyser module, taking into consideration an optimum temperature of 60° C. with a temperature of 80° C. at which the cooling system is triggered. The higher the value of the coefficient of distribution of available power determined, the more the electrolyser module will be liable to have a high functioning set point in comparison with the other electrolyser modules (leading to a more consistent supply of energy to the said electrolyser module concerned).

Thus, the energy can be distributed between the electrolyser modules selected, such as to have a maximum set point on the electrolyser modules close to a so-called optimum functioning temperature. By this means, the coldest electrolyser modules, which are less efficient than the hot electrolyser modules, will have a lower functioning set point. The electrolyser modules with a temperature which is close to the temperature of triggering of the cooling system will have an increasingly low set point in order to prevent them from activating their cooling system, which would consume energy in order to remove heat.

This method for distribution of the available power determined based on use of the equation (1) thus makes it possible to make the temperature of all the active electrolyser modules tend progressively towards the so-called optimum temperature, by favouring the functioning of the hot electrolyser modules whilst preventing them from using their cooling system.

The step of adjustment of the said real coefficients then takes into account in particular the following constraints:

Constraint concerning the distribution of all the energy available:

$$\Sigma \alpha_i^{real} = 1$$

Constraint of a maximum set point per electrolyser module:

$$\alpha_i^{real} \leq \frac{Maximum\ power\ per\ module}{Pavailable}$$

Minimum set point per electrolyser module:

$$\alpha_i^{real} \geq \frac{Minimum\ power\ per\ module}{Ne}$$

Where Maximum power per module is the maximum power which an electrolyser module can receive and Minimum power per module is the minimum functioning power of the electrolyser module.

The response to these different constraints can take the form of minimisation of the difference of each of the distribution coefficients $\alpha_i^{real}$ from the corresponding theoretical optimised coefficient $\alpha_i^{optimised}$. This minimisation can lead to the following function (minimisation of the sum of the differences):

$$\text{Minimise} \to \Sigma_{i=1}^{Ne}(|\alpha_i^{real} - \alpha_i^{optimised}|)$$

In other words, the minimisation of the difference between each optimised theoretical coefficient and the corresponding real coefficient can take into account the following constraints: the sum of the real coefficients of the said electrolyser modules selected is equal to 1; for each electrolyser module 2 selected, the corresponding real coefficient is lower than, or equal to, the maximum power of the said electrolyser module divided by the available power determined; for each electrolyser module 2 selected, the corresponding real coefficient is higher than, or equal to, a minimum power of the said electrolyser module 2 selected, divided by the number evaluated $N_e$ of electrolyser modules to be used.

Finally, the distribution of the available power determined during the supply step E5 can be such that the energy P_supply_mod_i sent to the corresponding active electrolyser module i is calculated by multiplying the real distribution level $\alpha_i^{real}$ by the input power of the electrolysis system (Pavailable), i.e.:

$$P\_supply\_mod\_i = Pavailable * \alpha_i^{real}$$

The invention also relates to an energy storage installation in the form of a product containing hydrogen. This installation comprises the electric energy supply system 3 configured such as to exploit the intermittent energy source, the electrolysis system 1 comprising the plurality of electrolyser modules 2 and configured such as to cooperate with the said electric energy supply system 3, and a control module 4 (FIG. 1) comprising the hardware and software elements for implementation of the control method as described. It will thus be appreciated that the electrolysis system makes it possible to generate the product, in particular from the electrolysis of water, such that it is stored in a tank of the installation.

It will be appreciated that a method for functioning of an installation as described can be put into practice. A method of this type can comprise a step of generation of electric power by the electric energy supply system, and a step of use of the electric power generated by the electrolysis system implementing the control method as described. In addition, the method can comprise a step of storage of the hydrogen produced by the electrolysis system, in particular in the tank of the installation. The installation can also be connected to an electricity network, and the functioning method can comprise a step of determination of an electric power required by the electricity network, and a step of removal from storage of the hydrogen stored in the tank to a fuel battery belonging to the installation, such as to generate the electric power required and injected into the electricity network.

The points listed hereinafter can constitute variants of the invention concerned:

The control module can control a plurality of electrolysis systems;

The electrolysis system(s) can use alkaline or PEM technology;

The electrolysis system can be connected to the electricity network. In this case, consumption from the electricity network is possible in order to supply the electrolysis system, this being able to be advantageous in particular when the cost of purchasing energy from the network is lower than the sale price determined for the energy produced from the product stored obtained from the functioning of the electrolysis system.

All of the foregoing information shows the following benefits which can be attributed to the implementation of the invention:

Assisting the use of the hot electrolyser modules which will have better production efficiency;

Limiting starting up of the cooling system (additional energy consumption) for the electrolyser modules close to the maximum functioning temperature;

Homogenising the temperature of the electrolyser modules to the optimum functioning temperature;

Participating in the limitation of the temperature of the electrolyser modules, in order to prevent them from deteriorating prematurely;

Improving the global production efficiency of the electrolysis system (decrease in the consumption of the auxiliary units and increase in the efficiency of the electrolyser modules).

The invention claimed is:

1. Method for controlling an electrolysis system which comprises a plurality of electrolyser modules and is configured to cooperate with an electric energy supply system which uses an intermittent energy source, the method comprising:

determining an available electric power which the electric energy supply system can provide;

evaluating a number $N_e$ of electrolyser modules to be used according to the determined available electric power;

selecting electrolyser modules to be supplied electrically among functional electrolyser modules of the plurality of electrolyser modules of the electrolysis system, taking into account the number evaluated $N_e$, wherein a number of selected electrolyser modules varies so that, in at least one configuration of the electrolysis system, the number of selected electrolyser modules is lower than a total number of functional electrolyser modules of the electrolysis system;

determining a temperature of each of the electrolyser modules selected;

supplying electrically the selected electrolyser modules, wherein the supplying is performed by the electric energy supply system, wherein the electric energy supply system distributes the determined available electric power to the selected electrolyser modules as a function of the determined temperatures of each of the selected electrolyser modules.

2. Method according to claim 1, wherein with each electrolyser module being configured to adopt (i) an active state when the electrolyser module is supplied by the electric energy supply system, or (ii) an inactive state when the electrolyser module is not supplied by the electric energy supply system, the selecting of the electrolyser modules comprises determining a current number of active electrolyser modules.

3. Method according to claim 2, wherein when the current number of active electrolyser modules determined is equal to the number evaluated $N_e$, then the selecting consists of selecting all the active electrolyser modules.

4. Method according to claim 2, wherein the selecting the electrolyser modules comprises determining temperatures of at least some of the electrolyser modules.

5. Method according to claim 4,
wherein with the determined current number of active electrolyser modules being greater than the number evaluated $N_e$, the temperatures determined during the selecting are those of the active electrolyser modules, and the electrolyser modules selected by the selection step correspond to the $N_e$ active electrolyser modules with the highest temperatures, and
wherein the supplying electrically of the electrolyser modules selected consists of supplying electrically only to the electrolyser modules selected.

6. Method according to claim 4,
wherein with the current number of active electrolyser modules determined being lower than the number evaluated $N_e$, the temperatures determined during the selecting are those of the inactive electrolyser modules, and the electrolyser modules selected by the selecting correspond to the active electrolyser modules plus at least one inactive electrolyser module, the temperature of which determined during the selecting is the highest, and
wherein the supplying electrically of the electrolyser modules selected consists of supplying electrically only the electrolyser modules selected.

7. Method according to claim 1, wherein the evaluating the suitable number $N_e$ of electrolyser modules to be used is calculated from the following equation:

$$NB_{WHOLE}\left(\frac{P_{available}}{P_{max\_module}}\right) + 1$$

where $P_{available}$ is the determined available electric power, $P_{max\_module}$ is the maximum power which each electrolyser module can receive, and $NB_{WHOLE}$ is the function which provides a whole value of the ratio $$\frac{P_{available}}{P_{max\_module}}.$$

8. Method according to claim 1, comprising determining the distribution of the determined available electric power,
wherein the determining the distribution comprises, for each electrolyser module selected:
determining a theoretical optimised coefficient of distribution of the determined available electric power, taking into account the determined temperature of the electrolyser module selected;
determining a real coefficient of distribution to be used for the electrolyser module selected, taking into account the corresponding theoretical optimised coefficient; and wherein the step of determining the distribution comprises adjusting the real coefficients.

9. Method according to claim 8,
wherein a difference between each optimised theoretical coefficient and the corresponding real coefficient is minimized, and
wherein the minimisation takes into account the following constraints:
the sum of the real coefficients of the electrolyser modules selected is equal to 1;
for each electrolyser module selected, the corresponding real coefficient is less than, or equal to, the maximum power of the electrolyser module selected divided by the determined available electric power;
for each electrolyser module selected, the corresponding real coefficient is higher than, or equal to, a minimum power of the electrolyser module selected divided by the number evaluated $N_e$.

10. Method according to claim 8, wherein in the adjusting of the real coefficients, a difference between each optimised theoretical coefficient and the corresponding real coefficient is minimized.

11. Method according to claim 2, wherein the evaluating the suitable number $N_e$ of electrolyser modules to be used is calculated from the following equation:

$$NB_{WHOLE\left(\frac{Pavailable}{Pmax\_module}\right)} + 1$$

where $P_{available}$ is the determined available electric power, $P_{max\_module}$ is the maximum power which each electrolyser module can receive, and $NB_{WHOLE}$ is the function which provides a whole value of the ratio $$\frac{Pavailable}{Pmax\_module}.$$

12. Method according to claim 2, comprising determining the distribution of the determined available electric power,
wherein the determining the distribution comprises, for each electrolyser module selected:
determining a theoretical optimised coefficient of distribution of the determined available electric power, taking into account the determined temperature of the electrolyser module selected;
determining a real coefficient of distribution to be used for the electrolyser module selected, taking into account the corresponding theoretical optimised coefficient; and
adjusting the real coefficients.

13. Method according to claim 12,
wherein a difference between each optimised theoretical coefficient and the corresponding real coefficient is minimized, and
wherein the minimisation takes into account the following constraints:
the sum of the real coefficients of the electrolyser modules selected is equal to 1;
for each electrolyser module selected, the corresponding real coefficient is less than, or equal to, the maximum power of the electrolyser module selected divided by the determined available electric power;
for each electrolyser module selected, the corresponding real coefficient is higher than, or equal to, a minimum power of the electrolyser module selected divided by the number evaluated $N_e$.

14. Method according claim 12, wherein when the current number of active electrolyser modules determined is equal to the number evaluated $N_e$, then the selecting consists of selecting all the active electrolyser modules.

15. Method according to claim 12, wherein the selecting of the electrolyser modules comprises determining temperatures of at least some of the electrolyser modules.

16. Method according to claim 15,
wherein with the determined current number of active electrolyser modules being greater than the number evaluated $N_e$, the temperatures determined during the selecting are those of the active electrolyser modules, and the electrolyser modules selected by the selecting correspond to the $N_e$ active electrolyser modules with the highest temperatures, and
wherein the supplying electrically of the electrolyser modules selected consists of supplying electrically only the electrolyser modules selected.

17. Method according to claim 15,
wherein with the current number of active electrolyser modules determined being lower the number evaluated $N_e$, the temperatures determined during the selecting are those of the inactive electrolyser modules, and the electrolyser modules selected by the selecting correspond to the active electrolyser modules plus at least one inactive electrolyser module, the temperatures of which determined during the selecting is the highest, and
wherein the supplying electrically of the electrolyser modules selected consists of supplying electrically only the electrolyser modules selected.

18. Method according to claim 12, wherein the evaluating the suitable number $N_e$ of electrolyser modules to be used is calculated from the following equation:

$$NB_{WHOLE\left(\frac{Pavailable}{Pmax\_module}\right)} + 1$$

where $P_{available}$ is the determined available electric power, $P_{max\_module}$ is the maximum power which each electrolyser module can receive, and $NB_{WHOLE}$ is the function which provides a whole value of the ratio $$\frac{Pavailable}{Pmax\_module}.$$

19. Method according to claim 2, wherein $N_e$ is less than the current number of active electrolyser modules.

20. Energy storage installation in the form of a product containing hydrogen, comprising:
an electric energy supply system configured to exploit an intermittent energy source;
an electrolysis system comprising a plurality of electrolyser modules, and configured to cooperate with the electric energy supply system;
a module to control the installation, comprising hardware and software elements configured to implement a control method comprising:
determining an available electric power which the electric energy supply system can provide;

evaluating a number $N_e$ of electrolyser modules to be used according to the determined available electric power;

selecting electrolyser modules to be supplied electrically among functional electrolyser modules of the plurality of electrolyser modules of the electrolysis system, taking into account the number evaluated $N_e$, wherein a number of selected electrolyser modules varies so that, in at least one configuration of the electrolysis system, the number of selected electrolyser modules is lower than a total number of functional electrolyser modules of the electrolysis system;

determining a temperature of each of the electrolyser modules selected;

supplying electrically the selected electrolyser modules, wherein the supplying is performed by the electric energy supply system, wherein the electric energy supply system distributes the determined available electric power to the selected electrolyser modules as a function of the determined temperatures of each of the selected electrolyser modules.

21. Energy storage installation according to claim 10,
wherein, with each electrolyser module being configured to adopt (i) an active state when the electrolyser module is supplied by the electric energy supply system, or (ii) an inactive state when the electrolyser module is not supplied by the electric energy supply system, the selecting the electrolyser modules comprises determining a current number of active electrolyser modules, and wherein the hardware and software elements are configured to determine the distributing of the determined available electric power by the electric energy supply system to the selected electrolyser modules by a method comprising, for each electrolyser module selected:

determining a theoretical optimised coefficient of distribution of the determined available electric power, taking into account the determined temperature of the electrolyser module selected;

determining a real coefficient of distribution to be used for the electrolyser module selected, taking into account the corresponding theoretical optimised coefficient; and adjusting the real coefficients.

* * * * *